US009424365B2

(12) United States Patent
Hammerschmidt et al.

(10) Patent No.: US 9,424,365 B2
(45) Date of Patent: Aug. 23, 2016

(54) XPATH-BASED CREATION OF RELATIONAL INDEXES AND CONSTRAINTS OVER XML DATA STORED IN RELATIONAL TABLES

(75) Inventors: Beda Christoph Hammerschmidt, San Carlos, CA (US); Zhen Hua Liu, San Mateo, CA (US); Thomas Baby, Maple Valley, WA (US)

(73) Assignee: Oracle International Corporation, Redwood Shores, CA (US)

( * ) Notice: Subject to any disclaimer, the term of this patent is extended or adjusted under 35 U.S.C. 154(b) by 234 days.

(21) Appl. No.: 12/610,164

(22) Filed: Oct. 30, 2009

(65) Prior Publication Data

US 2011/0106812 A1  May 5, 2011

(51) Int. Cl.
*G06F 7/00* (2006.01)
*G06F 17/30* (2006.01)

(52) U.S. Cl.
CPC ... *G06F 17/30917* (2013.01); *G06F 17/30241* (2013.01); *G06F 17/30327* (2013.01)

(58) Field of Classification Search
CPC .................... G06F 17/30241; G06F 17/30327
USPC .................................. 707/741, 792, 795, 743
See application file for complete search history.

(56) References Cited

U.S. PATENT DOCUMENTS

| | | | |
|---|---|---|---|
| 5,091,852 A * | 2/1992 | Tsuchida et al. | |
| 5,630,157 A * | 5/1997 | Dwyer, III | ........................ 712/23 |
| 6,965,903 B1 * | 11/2005 | Agarwal et al. | |
| 7,096,224 B2 * | 8/2006 | Murthy et al. | ................. 707/763 |
| 7,620,641 B2 * | 11/2009 | Nguyen et al. | |
| 9,092,417 B2 | 7/2015 | Lobo | |
| 2002/0078068 A1 * | 6/2002 | Krishnaprasad et al. | . 707/104.1 |
| 2002/0087531 A1 * | 7/2002 | Hara et al. | ........................ 707/3 |
| 2003/0014397 A1 * | 1/2003 | Chau et al. | ........................ 707/3 |
| 2004/0064466 A1 * | 4/2004 | Manikutty et al. | ........... 707/100 |
| 2004/0088117 A1 * | 5/2004 | Dorsett Jr. | ....................... 702/22 |
| 2004/0163041 A1 * | 8/2004 | Engel | ............................ 715/509 |
| 2004/0167917 A1 * | 8/2004 | Hara et al. | ..................... 707/100 |

(Continued)

OTHER PUBLICATIONS

Yoshikawa et al., M., "XREL: A Path-Based Approach to Storage and Retrieval of XML Documents Using Relational Databases,"ACM Transactions on Internet Technology (TOIT), vol. 1 Issue 1, Aug. 2001, pp. 110-141, ACM New York, NY, USA ISSN: 1533-5399.*

(Continued)

*Primary Examiner* — Mark E Hershley
(74) *Attorney, Agent, or Firm* — Hickman Palermo Becker Bingham LLP (57) ABSTRACT

Techniques and approaches are provided for creating indexes and column constraints on structured XML data that is stored in a relational database. Data Definition Language (DDL) Create Index and Create Constraint commands have extended syntax that allows the specification of a path-based expression instead of requiring a column and table name. A mapping created by the system when an XML Schema is registered stores the correspondence of XML data elements to automatically-created database tables and columns that are given names only useful for the internal system. When a user provides a path-based expression in a DDL when creating an index or constraint, the path-based expression is translated to the underlying database constructs using the mapping. Issues are addressed for handling path-based expressions that evaluate to more than one element. Additional index optimization is described using data type information available in the XML schema to select the optimal index type.

17 Claims, 5 Drawing Sheets

(56) References Cited

U.S. PATENT DOCUMENTS

| | | |
|---|---|---|
| 2005/0044113 A1* | 2/2005 | Manikutty et al. ........ 707/104.1 |
| 2005/0050059 A1* | 3/2005 | Van Der Linden et al. . 707/100 |
| 2005/0050074 A1* | 3/2005 | Jain et al. .................... 707/100 |
| 2005/0091188 A1* | 4/2005 | Pal et al. .......................... 707/1 |
| 2005/0228791 A1* | 10/2005 | Thusoo et al. .................... 707/6 |
| 2006/0218194 A1* | 9/2006 | Yalamanchi ............... 707/104.1 |
| 2007/0083542 A1* | 4/2007 | Agrawal et al. ............. 707/102 |
| 2007/0250527 A1* | 10/2007 | Murthy et al. .............. 707/102 |
| 2008/0065674 A1* | 3/2008 | Liu et al. ..................... 707/102 |
| 2008/0120321 A1* | 5/2008 | Liu et al. ..................... 707/102 |
| 2009/0055424 A1* | 2/2009 | Zhuang et al. .............. 707/102 |
| 2009/0150367 A1* | 6/2009 | Melnik et al. .................... 707/4 |
| 2009/0182762 A1* | 7/2009 | Chang et al. ................ 707/102 |
| 2009/0327253 A1* | 12/2009 | Joseph ............................. 707/4 |
| 2010/0023478 A1* | 1/2010 | Chandrasekar et al. .......... 707/2 |
| 2010/0185693 A1* | 7/2010 | Murty et al. ................. 707/803 |
| 2011/0067084 A1* | 3/2011 | Byun ................ G06F 17/30306 726/1 |

OTHER PUBLICATIONS

Pal et al, S., "Indexing XML Data Stored in a Relation Database," VLDB '04 Proceedings of the Thirtieth international conference on Very large data bases, vol. 30, pp. 1146-1157, VLDB Endowment ©2004, ISBN: 0-12-088469-0.*

* cited by examiner

```
<auction>
  <site>
    <regions>                                    120
      <africa>
          <item> sales=$4M </item>
          <item> sales=$15M </item>
      </africa>
    </regions>
    <regions>                                    130
      <europe>
          <item> sales=$3M </item>
      </europe>
    </regions>
    <regions>
      <southamerica >                            140
          <item> sales=$7M </item>
      </southamerica>
    </regions>
    <regions>
      <northamerica>                             150
          <item>sales=$20M></item>
      </northamerica>
    </regions>
  </site>
<auction>
```

```
<PurchaseOrder poDate= "July 20, 2009"
    <shipAddr>
        <city>San Mateo</city>
        <zipcode>94402</zipcode>
    </shipAddr>
    <lineItem>
        <name> PC </name>
        <price> $1300 </price>
        <quantity> 1 </quantity>
        <category> computer </category>
    </ lineItem >
    < lineItem >
        <name> printer </name>
        <price> $350 </price>
        <quantity> 2 </quantity>
        <category> peripherals </category>
    </ lineItem >
</PurchaseOrder>
```

PURCHASEORDER TABLE 310

| key | poDate | City | Zip |
|---|---|---|---|
| 1 | July 20, 2009 | San Mateo | 94402 |

LINEITEM TABLE 320

| Foreign key | Name | Price | Quantity | Category |
|---|---|---|---|---|
| 1 | PC | $1300 | 1 | 1 |
| 1 | Printer | $350 | 2 | 2 |

FIG. 5

XPATH-BASED CREATION OF RELATIONAL INDEXES AND CONSTRAINTS OVER XML DATA STORED IN RELATIONAL TABLES

FIELD OF THE INVENTION

The present invention relates to generating indices or constraints on XML data stored in a relational database.

BACKGROUND

XML

Extensible Markup Language (XML) is a World Wide Web Consortium (W3C) standard for representing data. Many applications are designed to output data in the form of XML documents. Various techniques may be used to store data from such XML documents into a relational database.

XML data comprises structured data items that form a hierarchy. In XML, data items known as elements are delimited by an opening tag and a closing tag. An element may also comprise attributes, which are specified in the opening tag of the element. Text between the tags of an element may represent any sort of data value, such as a string, date, or integer. An element may have one or more children. The resulting hierarchical structure of XML-formatted data is discussed in terms akin to those used to discuss a family tree. For example, a sub-element is said to descend from its parent element or any element from which its parent descended. A parent element is said to be an ancestor element of any sub-element of itself or of one of its descendant elements. Collectively, an element along with its attributes and descendants, are often referred to as a tree or a sub-tree.

XML Schema

XML Schema is a definition language that provides facilities for describing structure and constraining the contents of an XML document. A draft specification, referred to hereinafter as "XML Schema Specification", for the XML Schema definition language is described in a set of three documents published by the W3C Consortium. The first document in the set is "XML Schema Part 0: Primer Second Edition", W3C Recommendation 28 Oct. 2004, located at "http://www.w3.org/TR/xmlschema-0/", the entire contents of which are hereby incorporated by reference for all purposes as if fully set forth herein. The second document in the set is "XML Schema Part 1: Structures Second Edition", W3C Recommendation 28 Oct. 2004, located at "http://www.w3.org/TR/xmlschema-1/", the entire contents of which are hereby incorporated by reference for all purposes as if fully set forth herein. The third document in the set is "XML Schema Part 2: Datatypes Second Edition", W3C Recommendation 28 Oct. 2004, located at "http://www.w3.org/TR/xmlschema-2/", the entire contents of which are hereby incorporated by reference for all purposes as if fully set forth herein.

As referred to herein, an XML schema is a defined structure for XML documents. An XML schema representation is data that describes the XML structure. An XML schema representation may include an XML document with declarations and/or a tokenized XML representation which is one for which tokens have been generated. An example of an XML schema representation includes, but is not limited to, an XML document with type definitions, element declarations, or attribute declarations.

Storing XML Data

Storing XML data in a relational database is desirable because database operations have been optimized and highly tuned for performance. In order to realize the performance gains of storing XML data in a database, queries on the XML data must be translated into native SQL commands that can then be optimized according to the relational techniques.

XML may be stored in a database in one of several different ways. One way is to treat an XML document as a single data item, and stored as such in a single column of a relational table. This technique is convenient when the documents in the set of XML documents to be stored does not share the same structure (i.e., does not conform to the same schema) or does not have a schema that describes its structure. Storing entire documents in a single column is advantageous in that the XML does not have to be processed before the XML is submitted to the database server. However, because the database server considers the XML document a single data item, the database server is unable to take advantage of the fact that XML documents are structured, where a single XML document may include numerous attributes and elements with specific values. Each time a document is retrieved, the document will need to be further processed to find the elements internal to the document.

According to an alternative technique, an XML document may be split up into its constituent attributes and element data before the XML document is stored in a database. This alternative technique is possible when the set of documents conform to the same XML schema. The schema may be registered with the database to create a mapping between XML types and database types. The values for each attribute and element are submitted to the database for insertion in corresponding columns of a table. When this technique is used, the database server may be used to select data based on individual attribute values. However, when the data is retrieved from the database, the attribute values are provided as distinct data items, not as part of a single XML document.

XQuery/XPath

It is important for object-relational database systems that store XML data to be able to execute queries using XML query languages. XML Query Language (XQuery) and XML Path Language (XPath) are important standards for a query language, which can be used in conjunction with SQL to express a large variety of useful queries. XPath is described in *XML Path Language (XPath)*, version 1.0 (W3C Recommendation 16 Nov. 1999), herein incorporated by reference and available at the time of writing at http://www.w3.org/TR/xpath, as well as in *XML Path Language (XPath)* 2.0 (W3C Recommendation 23 Jan. 2007), herein incorporated by reference and available at the time of writing at http://www.w3.org/TR/xpath. XQuery is described in *XQuery 1.0: An XML Query Language* (W3C Recommendation 23 Jan. 2007), herein incorporated by reference and available at the time of writing at http://www.w3.org/TR/xquery. The term XML query is used to refer to queries that conform to (1) XQuery, XPath, and/or another XML language standard, (2) SQL queries that may embed XQuery or XPath expressions, (3) queries of other languages, and (4) proprietary dialects of XQuery, XPath, SQL, or XML standard languages.

Database servers that store XML documents may be enhanced to efficiently perform XML operations using XPath and XQuery. In order to support queries of XML data using XQuery/XPath, database servers rely on the XML structure mapping created when the schema was registered and the database storage constructs were created to store the structured XML data. The mapping is used to translate the XQuery/XPath into native database SQL commands on the underlying database tables.

Paths

The structure of an XML document establishes parent-child relationships between the nodes within the XML document. The "path" for a node in an XML document reflects the series of parent-child links, starting from a "root" node, to arrive at the particular node. For example, referring to the document shown in FIG. 1, the path to the "regions" node is /auction/site/regions/, since the "regions" node is a child of the "site" node, the "site" node is a child of the "auction" node.

Figure 1:
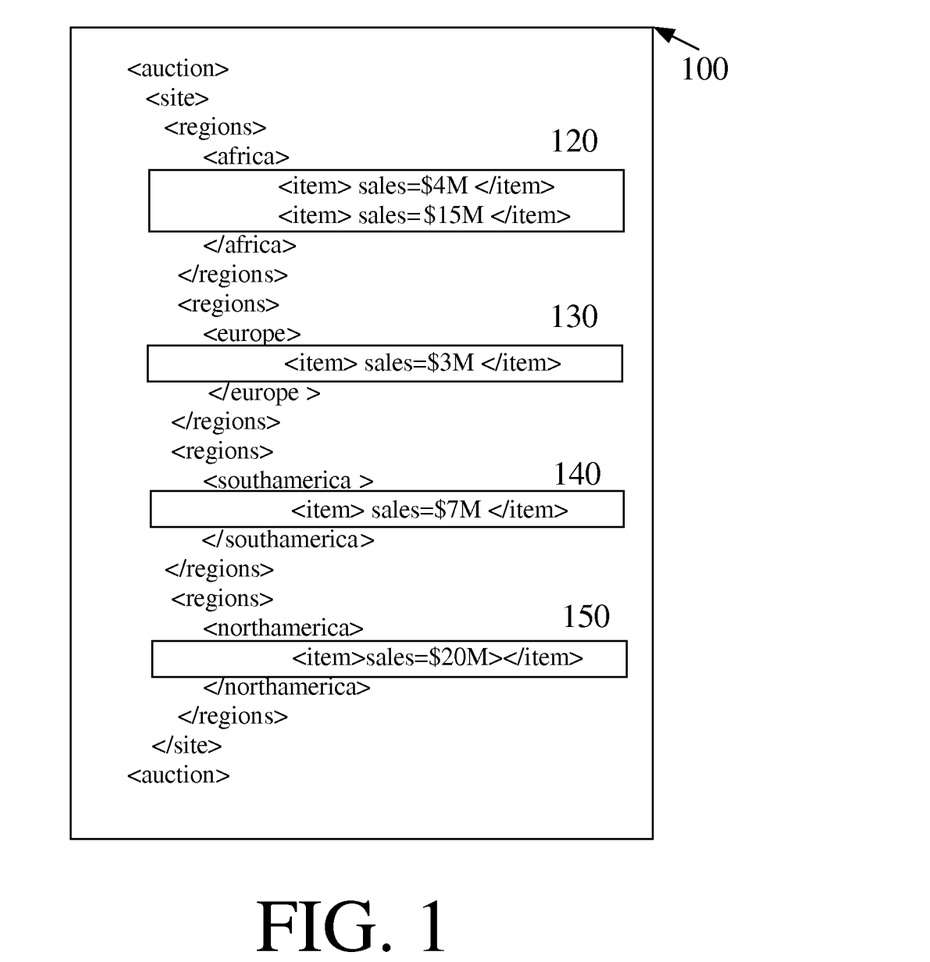
FIG. 1 is a diagram showing an example XML document.

An XPath starting with two slashes, "//", uses "descendent" syntax. The elements following the "//" may appear anywhere in the tree. Referring to FIG. 1 for an example XML document 100, a single XPath of "//item/@ sales" would evaluate to the following five values:

/auction/site/regions/africa/item/@sales=$4M
/auction/site/regions/africa/item/@sales=$15M
/auction/site/regions/europe/item/@sales=$3M
/auction/site/regions/southamerica/item/@sales=$7M
/auction/site/regions/northamerica/item/@sales=$20M Similarly, an XPath with an asterisk, "*", signifies a wildcard that can match any element at that position in the tree. Thus, a single XPath of "/auction/site/regions/*" evaluate to the following elements:

/auction/site/regions/africa
/auction/site/regions/europe
/auction/site/regions/southamerica
/auction/site/regions/northamerica Creating an Index Indexes are used to speed up the performance of querying certain database tables. Users create indexes based on knowledge of common usage patterns so as to speed up the most commonly performed operations. Users use Data Definition Language (DDL) commands to request the creation of an index on a named table and column. When XML is stored in a database table, the DDL commands to create an index on the XML data needs to reference the name of the database table and column in which the XML data is stored.

Creating a Column Constraint

Users may also create column value constraints to speed up access performance. More efficient indexes may be built on columns with constraints. A user who knows the range of values that may be stored in a column may specify that range in association with the column. If there is an attempt to place a value in a column where the value does not conform to the constraint, an error will be generated. As when creating an index, creating a column constraint on XML data requires referencing the name of the database table and column to which the constraint applies.

Functional Index

A functional index is an index that is created on the results of a function on a column value. If a common query requires performing a function on database values, the function values may be pre-computed and placed in an index. As a function, by definition, may only return a single value, each column value may only have a single functional index entry that indexes the column value.

A Bitmap Index

A bitmap index is an index that includes a set of bitmaps that can be used to efficiently process queries on a body of data associated with the bitmap index. A bitmap index can be much faster than a b-tree index when the data can have one of a relatively small number of potential values. In the context of bitmap indexes, a bitmap is a series of bits that indicate which of the records stored in the body of data satisfy a particular criterion. Each record in the body of data has a corresponding bit in the bitmap. Each bit in the bitmap serves as a flag to indicate whether the record that corresponds to the bit satisfies the criterion associated with the bitmap.

When a bit in a bitmap of a key value is referred to as being set, the bit is set to a value that specifies that the corresponding row satisfies one or more criteria (e.g. has the key value). When the bit is referred as being unset, the bit is set to a value that specifies that the corresponding row does not contain the key value. For purposes of exposition, a bit is set to 1 and unset to 0. However, the present invention is not so limited.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

Techniques are provided for creating indexes and column constraints on structured XML data that is stored in a relational database. Before XML data is stored in a relational database, an XML schema is registered with the database system. Tables are automatically created for the XML data and named using identifiers useful for within the system, but the names are not user-friendly. The database system creates a mapping from the elements in the XML schema to the automatically generated database tables and columns that store those elements. When users submit a query to the database system for XML data expressed in XPath/XQuery syntax, the mapping is consulted to translate the path expression into the underlying table and column database structures where the required data is stored.

Although the tables can be automatically-generated and named based on a registered XML Schema, effective indexes and constraints for improving access performance rely on an understanding of the access patterns. Information about access patterns is not available from the schema. For that reason, indexes and constraints are not created automatically when the tables are created. Thus, a user who is knowledgeable about the common access patterns may create an index on the appropriate tables to speed up accessing the tables. A user who is knowledgeable about the range of values that will be stored in a column may create a constraint on that column. After the tables have been created, users use DDL commands to create indexes and constraints. However, to create an index or a constraint on relational data, the DDL commands require specifying the table and column names to be indexed. Since the table name is automatically generated, the user probably does not know the table name, and even if the user could find out, creating an index or constraint would be tedious and error-prone because the table and column names are not mnemonic. Furthermore, table names can vary from system to system as each system generates a different name when the XML schema is registered. In addition, path-based syntax is a more natural way of identifying a set of XML nodes to index or constrain. Using path-based syntax relieves the user from having to know what the underlying database constructs are that have been generated internal to the database system for storing the XML data.

To address the needs expressed above, the DDL command syntax is changed to allow users to specify indexes and constraints using XML syntax rather than identifying the machine-generated names for the underlying database tables and columns. The same XML-to-relational mapping that is created when the schema is registered may be used to translate XPath expressions specified in a DDL CREATE INDEX or CREATE CONSTRAINT command.

The mapping from XML schema to database construct also provides information for optimizing the performance of an index created based on data types of the XML elements. The mapping also may be used to identify when a request for indexing based on a path requires multiple indexes to be created because a single path-based expression can identify a plurality of nodes in an XML document.

Example XML Stored in Database Tables

Figure 2:
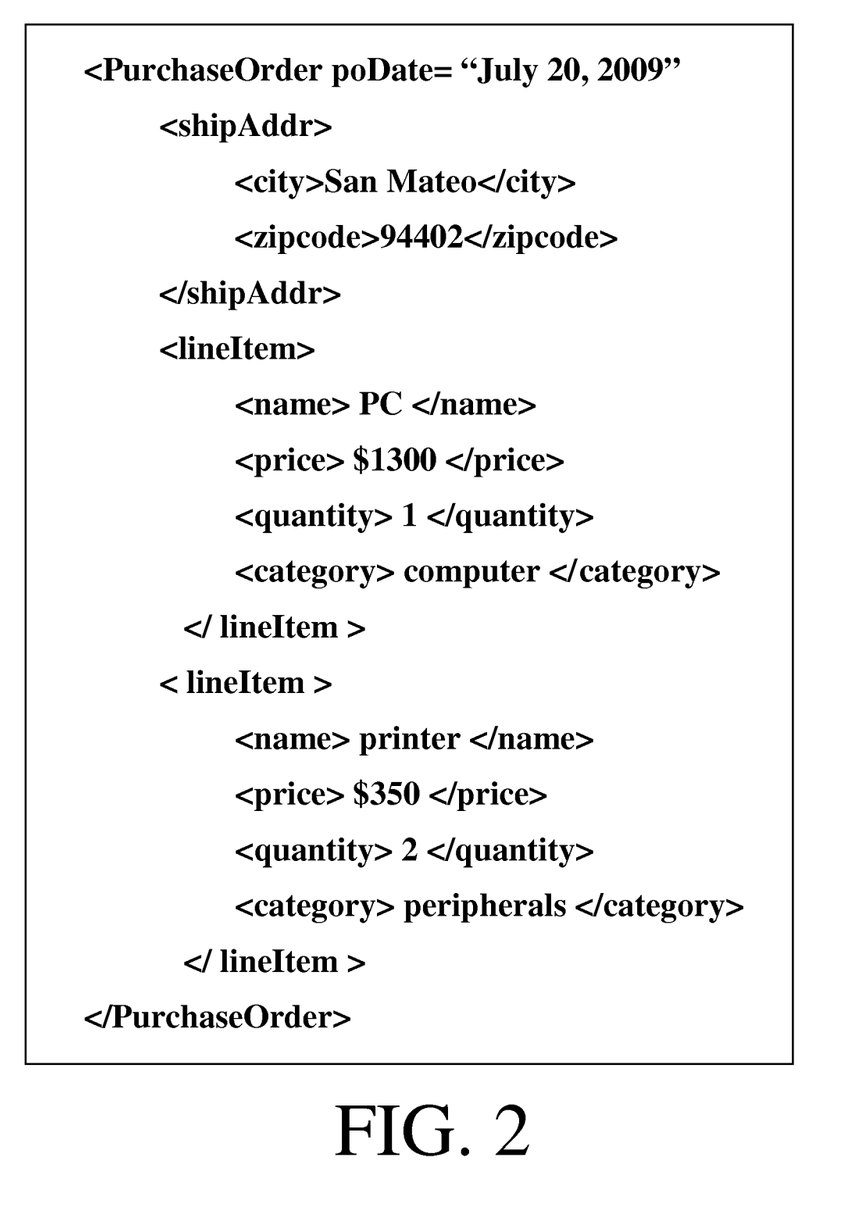
FIG. 2 is a diagram showing an example XML document to be stored in a database.
Figure 3:
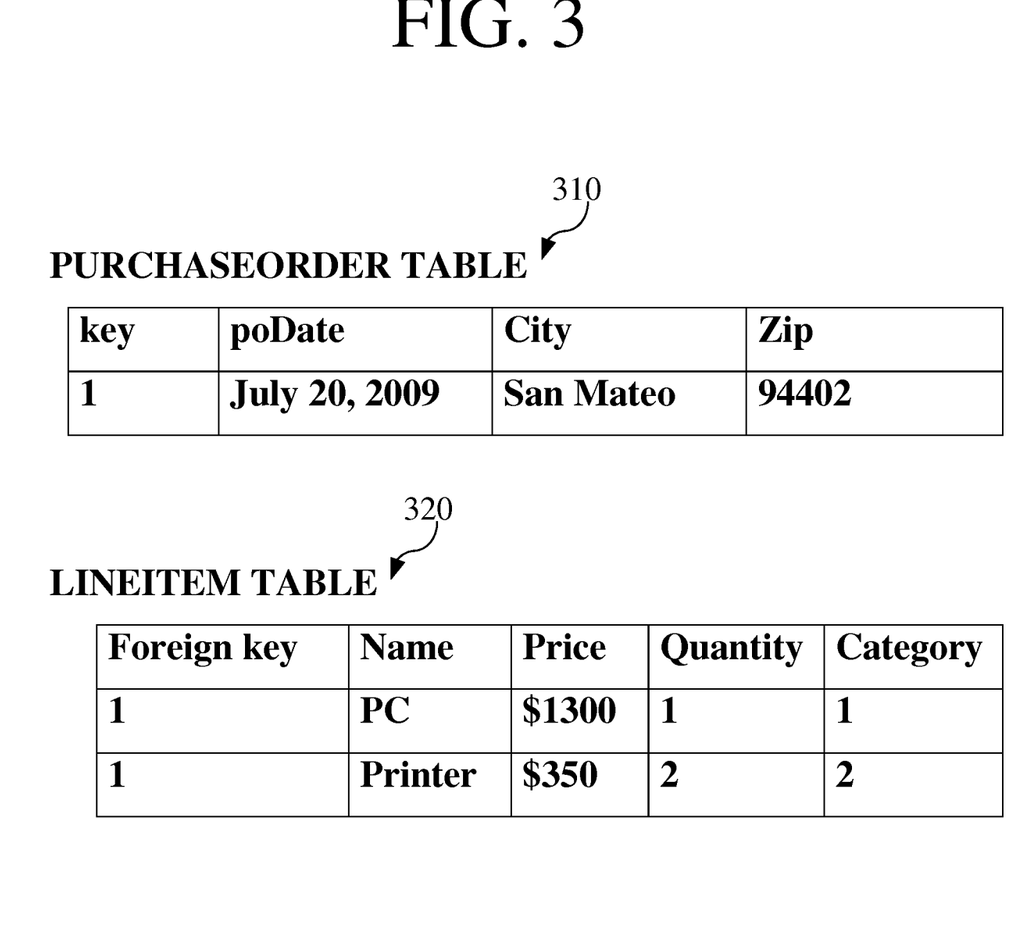
FIG. 3 is a diagram showing the database tables storing the example XML document from FIG. 2 according to an embodiment of the invention.

FIG. 2 shows an example XML document to be stored in a database. The document is a purchase order. The first element in the purchase order is a shipping address. Each purchase order has a single shipping address and one or more line items that represent what was purchased. When the schema for the example XML document is registered, a separate PURCHASEORDER table and LINEITEM table are automatically generated. FIG. 3 shows the example XML document from FIG. 2 loaded into the database tables. Although not shown in the example, there would also be a column in each of these tables that would associate rows of the LINEITEM table with a corresponding row of the Purchase Order table.

The elements stored directly in the Purchase Order table are stored in scalar columns. That is, for each row in the Purchase Order table, there is only one value for each column of the row. For example, there is only one date, city, and zip code value for each purchase order. In contrast, there may be multiple rows in the LINEITEM table for each purchase order, so an XPath that identifies the LINEITEM table will identify a collection column (more than one value for the XPath expression).

XPath Expression Identifies a Single Data Item

Different aspects of the technique are demonstrated based on the nature of the XPath expression used to specify the data to index or constrain. In one embodiment, an XPath expression identifies a single data item. For example, referring to FIG. 3, if the user wants to perform a query on this data to find all purchase orders placed in the months of June and July 2009, the user might use an XPath such as:

/PurchaseOrder [@poDate>='2009-06-01' and @poDate<'2009-08-01']

Using the table names shown in FIG. 3, this XPath expression would be translated into SQL as:

```
select from PURCHASEORDER
    where poDate > '2009-06-01' and poDate < '2009-08-01'
```

Creating an index on the poDate column may make the above query more efficient.

Create Index indexname on PURCHASEORDER('/PurchaseOrder/@poDate')

This example demonstrates the simplest case of an XPath identifying data stored in a scalar column. There is only one purchase order date in each purchase order. The index can be created directly on the Purchase Order table.

Create Index is the usual DDL command for creating an index, but the syntax shown here is enhanced to accept an XPath expression instead of a database column name. The system uses the mapping of the XML Schema to database table name that is created when the schema is registered to determine that the PurchaseOrder element specified by the path /PurchaseOrder is represented by the PURCHASEORDER table, and the attribute poDate corresponds to the poDate column within the PURCHASEORDER table. Thus, after automatic translation from XPath to database construct names, the system rewrites the DDL command as:

Create index indexname on PURCHASEORDER (poDate)

Previous approaches to path-based indexing of XML data have created indexes on functions of the paths themselves. When creating such a path-based index, the function name and the path are stored as the keys to the index. In order for a functional index to be able to compute a query that includes a path expression, the path expression in a query must match exactly a path stored as a key to the index. Thus, it is not sufficient for a query path expression to be semantically equivalent (that is, evaluate to the same data item). A path-based functional index requires the expressions to be syntactically identical. As a result, there is a benefit to rewriting DDL commands in terms of relational tables rather than indexing directly on the path-based expressions. When a relational index is created based on the specification of a path-based expression, the expression is evaluated, and its underlying equivalent relational structure is used to define and construct the index. Since multiple semantically equivalent XPath expressions will evaluate to the same underlying relational structures, there is no need for a syntactic match between the XPath specified in the query and the path specified at index creation time.

XPath Expression Identifies Multiple Data Items

Building a functional index on a path-based column may be problematic. As shown above, there may be several different ways of identifying the same XML node using XPath syntax. If the query identifies a node using a different path-based syntax than the path used to create the functional index entry (e.g. the query is expressed using descendent notation and the index is created with absolute paths), then the path is not found in the index, and the index cannot be used to evaluate the query. A functional index cannot be created on paths that return multiple values for the same XML document, as a function returns only a single value. For example, extractValue('/PurchaseOrder/lineitem/price') causes an error to be generated because there are two values ($1300 and $350) that are identified by the path ('/PurchaseOrder/lineitem/price') for the same XML document. Thus, only scalar columns may be indexed as a functional index using paths. But as seen above, an XPath expression may evaluate to multiple values. For these reasons, a different approach is needed to creating indexes that can handle path-based arguments.

In another embodiment, an XPath expression may identify multiple data items. In the example, an XPath that identifies a line item or a part of a line item requires indexing a collection table. For example, a query:

/purchaseOrder/lineItem [price>100]

can be translated into SQL as:

```
select from LINEITEM
    where price > 100 and LINEITEM.foreignKey =
        PURCHASEORDER.PrimaryKey
```

To speed up the query, the user might want to index the lineitem price.

Create Index indexname on PURCHASEORDER('/purchaseOrder/lineItem/price')

This may be automatically rewritten as:

Create Index indexname on LINEITEM (price)

Just as the query re-writing process depends on knowing that /purchaseOrder/lineItem should translate to querying the lineItem table, Create Index must also know this correspondence to determine which table to index. It is important for the system to be able to recognize that the index is being created on a collection column because the index must be created on the collection table, not on the primary table. Analysis of the XPath includes finding the leaf level collection table and creating the index on that collection table. Arbitrary number of levels in the hierarchy can be analyzed.

Deriving the Index Type from the XML Schema

In another embodiment, information found in the XML schema may be used to optimize the performance of an index by choosing the most efficient kind of index for the data type of the element to be indexed. For example, a bitmap index may be automatically generated for those XML data items that are defined in the XML schema as an enumeration type. Data having an enumeration type may only be assigned one of a fixed set of values. Each of the possible alternative values may be represented as a bitmap. Using a bitmap index may be faster for retrieving data with enumerated types than using a more general b-tree index.

Creating Composite (Btree) Indexes

Here's an example query that requires values from more than one column to be accessed:

/PO/lineItem[price>100 and quantity>3]

translated into SQL as

```
select from LINEITEM
    where price > 100 and quantity > 3
        and LINEITEM.f = PURCHASEORDER.pkey
```

If queries requiring values from both the price and quantity columns are often performed, then a composite index on the price and quantity columns could speed up execution of these frequent queries. Another embodiment allows for the creation of composite indexes. Creating composite indexes requires identifying a plurality of columns on which to form a single index. Thus, a plurality of XPath expressions is used to specify the columns. For example,

```
Create Index (/purchaseOrder/lineItem/price,
    /purchaseOrder/lineItem/quantity)
        indexname
``` may be automatically rewritten into SQL as:

```
Create Index indexname on purchaseOrder
    ('/puchaseOrder/lineItem/price',
        '/purchaseOrder/lineItem/quantity')
```

Creating Multiple Indexes with One DDL Statement

Figure 4:
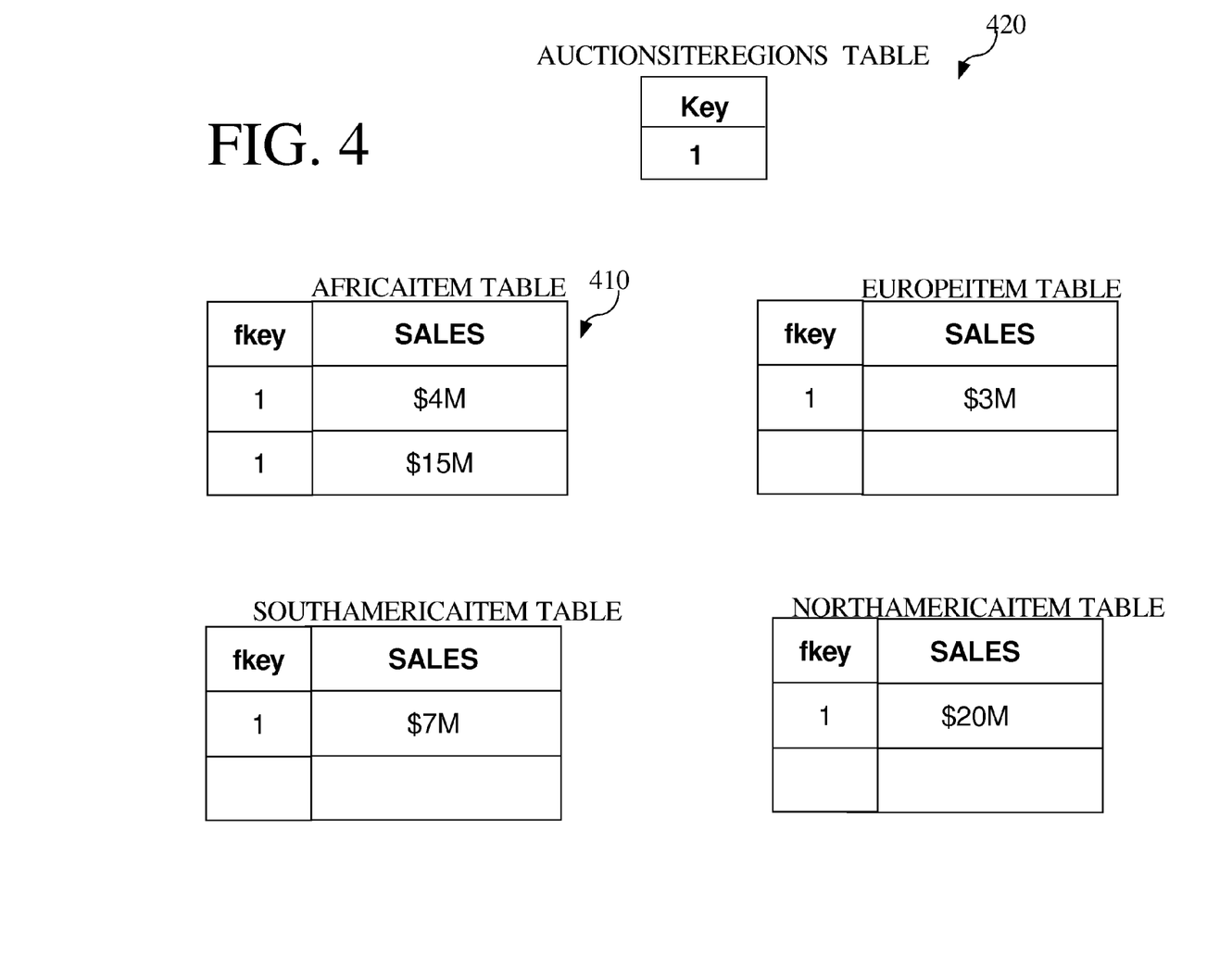
FIG. 4 is a diagram showing database tables storing the example XML document shown in FIG. 1.

If the schema for the XML document shown in FIG. 1 were registered with the database server, the XML data might be loaded into generated tables as shown in FIG. 4. FIG. 4 shows five tables. For each XML document, there is exactly one row in the AUCTIONSITEREGIONS table. This table comprises foreign key pointers to the other tables. The sales information cannot be stored within the AUCTIONSITEREGIONS table because there can be multiple sales items within each region, and multiple instances of the same region within the document. If an index were to be created for this set of documents, the command:

CREATE INDEX indexname on purchaseOrder('/auction/site/regions/*/items/sales')

would result in indexes being created for each of the region tables: AFRICAITEM table, EUROPEITEM table, SOUTHAMERICAITEM table, and NORTHAMERICA table. Thus, one create index command would create four indexes because the path would evaluate to items in four different tables.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 5:
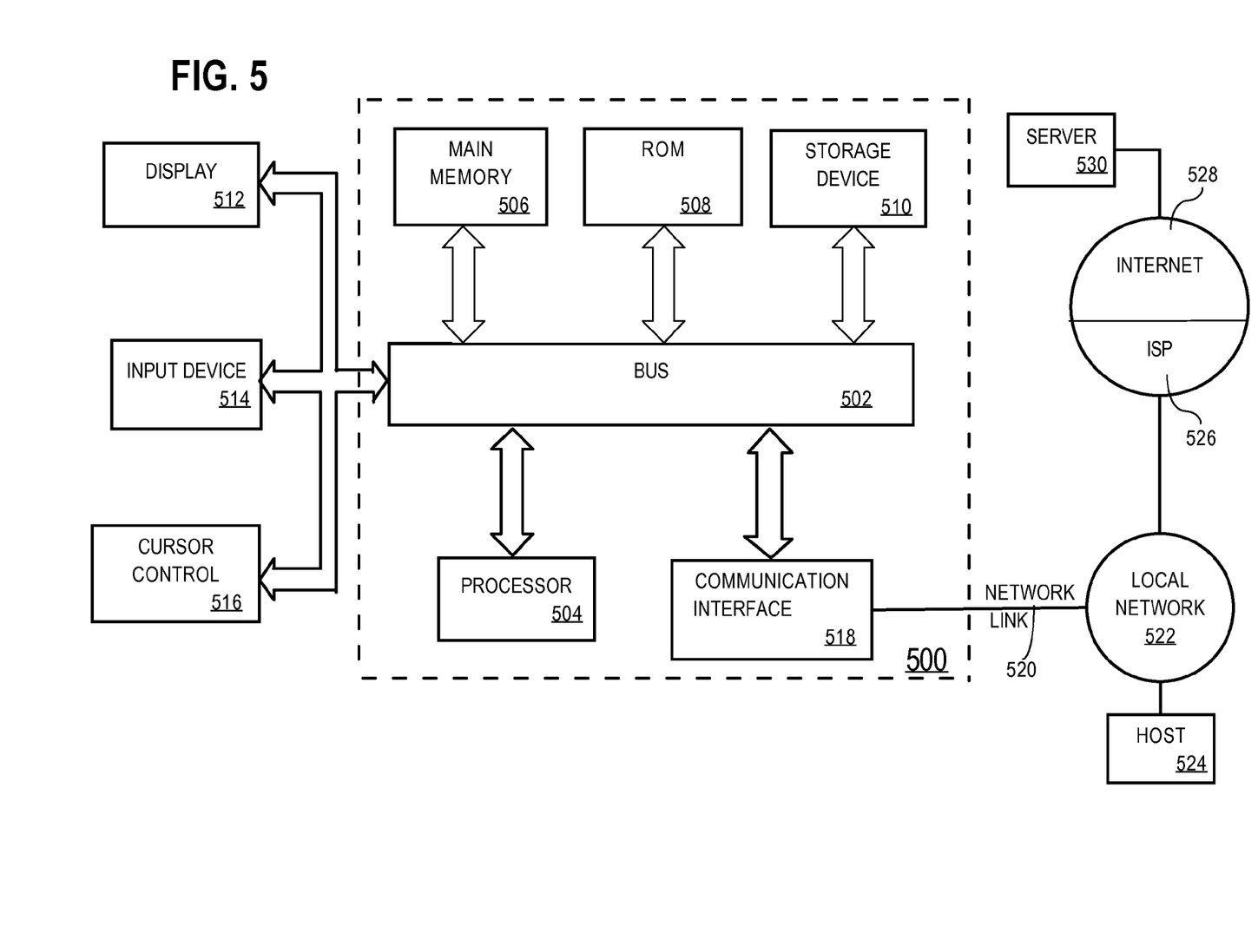
FIG. 5 is a diagram of a computer system on which an embodiment of the invention may be implemented.

For example, FIG. 5 is a block diagram that illustrates a computer system 500 upon which an embodiment of the invention may be implemented. Computer system 500 includes a bus 502 or other communication mechanism for communicating information, and a hardware processor 504 coupled with bus 502 for processing information. Hardware processor 504 may be, for example, a general purpose microprocessor.

Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Such instructions, when stored in storage media accessible to processor 504, render computer system 500 into a special-purpose machine that is customized to perform the operations specified in the instructions.

Computer system 500 further includes a read only memory (ROM) 508 or other static storage device coupled to bus 502 for storing static information and instructions for processor 504. A storage device 510, such as a magnetic disk or optical disk, is provided and coupled to bus 502 for storing information and instructions.

Computer system 500 may be coupled via bus 502 to a display 512, such as a cathode ray tube (CRT), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

Computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor 504 executing one or more sequences of one or more instructions contained in main memory 506. Such instructions may be read into main memory 506 from another storage medium, such as storage device 510. Execution of the sequences of instructions contained in main memory 506 causes processor 504 to perform the process steps described herein. In alternative embodiments, hard-wired circuitry may be used in place of or in combination with software instructions.

The term "storage media" as used herein refers to any media that store data and/or instructions that cause a machine to operation in a specific fashion. Such storage media may comprise non-volatile media and/or volatile media. Non-volatile media includes, for example, optical or magnetic disks, such as storage device 510. Volatile media includes dynamic memory, such as main memory 506. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 502. Transmission media can also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid state drive of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are example forms of transmission media.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 510, or other non-volatile storage for later execution.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A computer-implemented method comprising:
receiving a data definition language (DDL) command to create a relational index or constraint on one or more base columns of a base table in an object-relational database, wherein the DDL command specifies a path expression and does not specify a column name, wherein the constraint prevents storage of a value into one of the one or more base columns;
based on (a) the path expression specified in the DDL command to create the relational index or constraint and (b) object-relational database mapping information that indicates a mapping of elements in XML data to corresponding base columns in the object-relational database, determining that the one or more base columns correspond to one or more particular elements identified by the path expression;
based on determining that the one or more base columns correspond to the one or more particular elements identified by the path expression, a database server automatically creating the relational index or constraint on the one or more base columns.

2. The method of claim 1, wherein determining that the one or more base columns correspond to one or more particular elements identified by the path expression is based on information in an XML schema to which the XML data conforms; and
wherein the object-relational database mapping information associates particular XML schema elements of the XML schema to corresponding base columns in the object-relational database.

3. The method of claim 1, wherein the path expression uses wildcard or descendent syntax.

4. The method of claim 1, wherein the path expression evaluates to more than one XML, element.

5. The method of claim 4, wherein the more than one XML element reside in a same collection column, and further comprising creating an index on a collection table holding said same collection column.

6. The method of claim 4, wherein the more than one XML element reside in different tables, and further comprising creating an index on each of the different tables containing an XML element of the more than one XML elements.

7. The method of claim 1, wherein the relational index is a composite index, wherein the composite index is a single index that identifies a row of a database table, wherein the composite index is created based on values stored in more than one column of the row of the database table.

8. The method of claim 1 wherein create a relational index comprises creating a bitmap index that reserves a separate bit for each of separate instances of an XML element.

9. The method of claim 8, wherein the relational index indexes an XML element that has an enumerated type.

10. A non-transitory computer-readable medium storing instructions which, when executed by one or more processors, cause:
receiving a data definition language (DDL) command to create a relational index or constraint on one or more base columns of a base table in an object-relational database, wherein the DDL command specifies a path expression and does not specify a column name, wherein the constraint prevents storage of a value into one of the one or more base columns;
based on (a) the path expression specified in the DDL command to create the relational index or constraint and (b) object-relational database mapping information that indicates a mapping of elements in XML data to corresponding base columns in the object-relational database, determining that the one or more base columns correspond to one or more particular elements identified by the path expression;
based on determining that the one or more base columns correspond to the one or more particular elements identified by the path expression, a database server automatically creating the relational index or constraint on the one or more base columns.

11. The non-transitory computer-readable medium of claim 10, wherein determining that the one or more base columns correspond to one or more particular elements identified by the path expression is based on information in an XML, schema to which the XML data conforms; and
wherein the object-relational database mapping information associates particular XML schema elements of the XML schema to corresponding base columns in the object-relational database.

12. The non-transitory computer-readable medium of claim 10, wherein the path expression uses wildcard or descendent syntax.

13. The non-transitory computer-readable medium of claim 10, wherein the path expression evaluates to more than one XML element.

14. The non-transitory computer-readable medium of claim 13, wherein the more than one XML element reside in a same collection column, and wherein the instructions which, when executed by one or more processors, further cause creating an index on a collection table holding said same collection column.

15. The non-transitory computer-readable medium of claim 13, wherein the more than one XML element reside in different tables, and wherein the instructions which, when executed by one or more processors, further cause creating an index on each of the different tables containing an XML element of the more than one XML elements.

16. The non-transitory computer-readable medium of claim 10, wherein the relational index is a composite index, wherein the composite index is a single index that identifies a row of a database table, wherein the composite index is created based on values stored in more than one column of the row of the database table.

17. The non-transitory computer-readable medium of claim 10, wherein the relational index indexes an XML element that has an enumerated type, and create a relational index comprises creating a bitmap index that reserves a separate bit for each of separate instances of the XML, element.

\* \* \* \* \*